March 14, 1933.  D. KAPUCZIN  1,901,348
FLUID DISPENSER OR METER
Filed Feb. 21, 1928  2 Sheets-Sheet 1
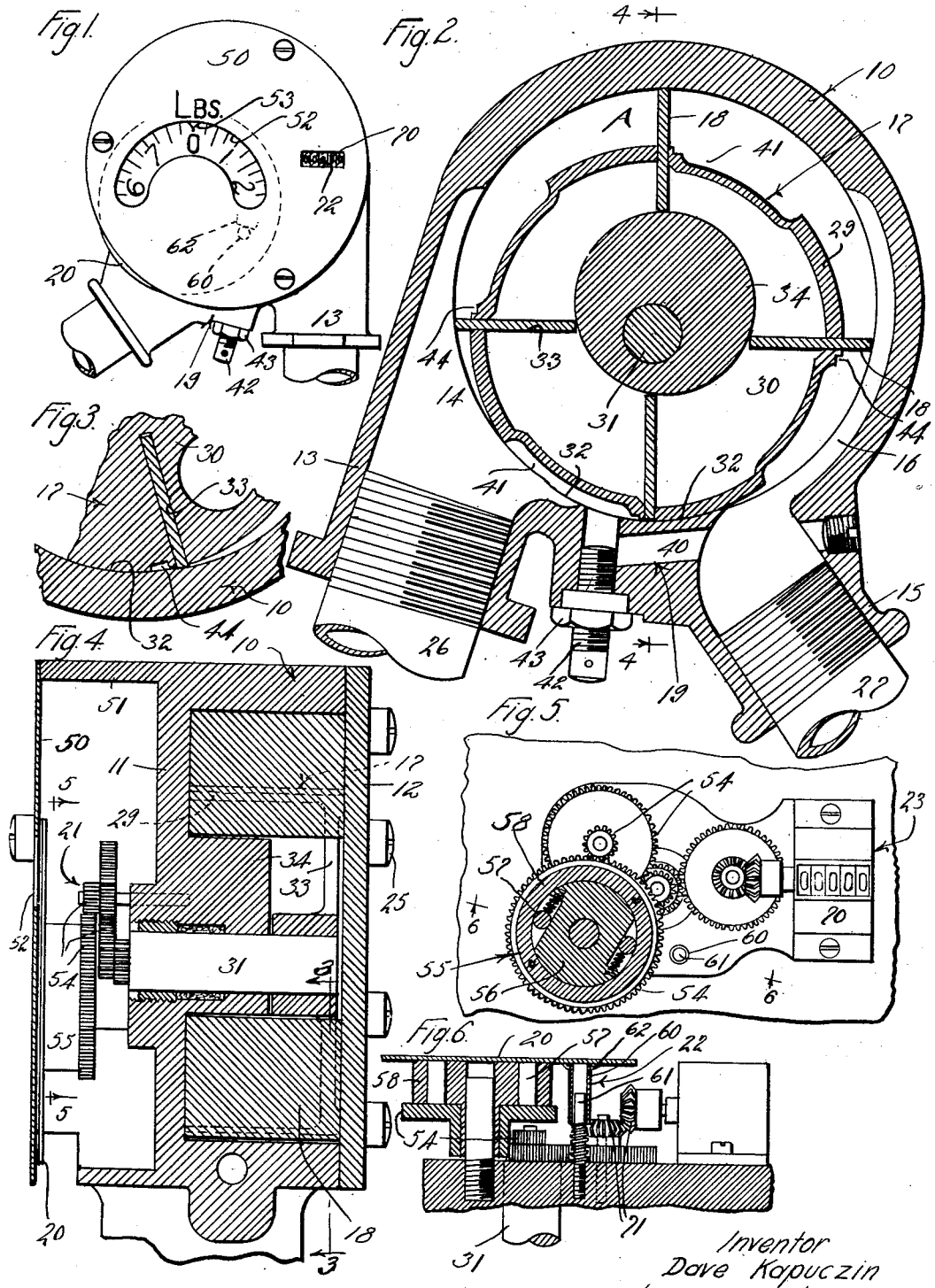
Inventor
Dave Kapuczin
by W. H. Chadwell
his Attorney

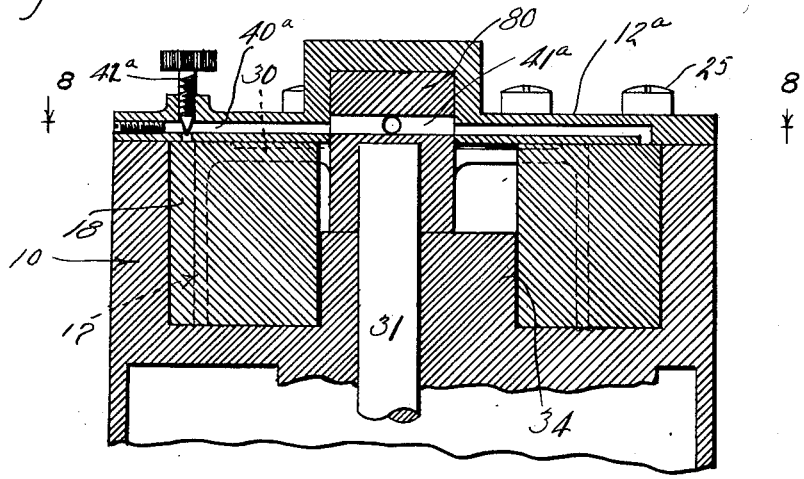
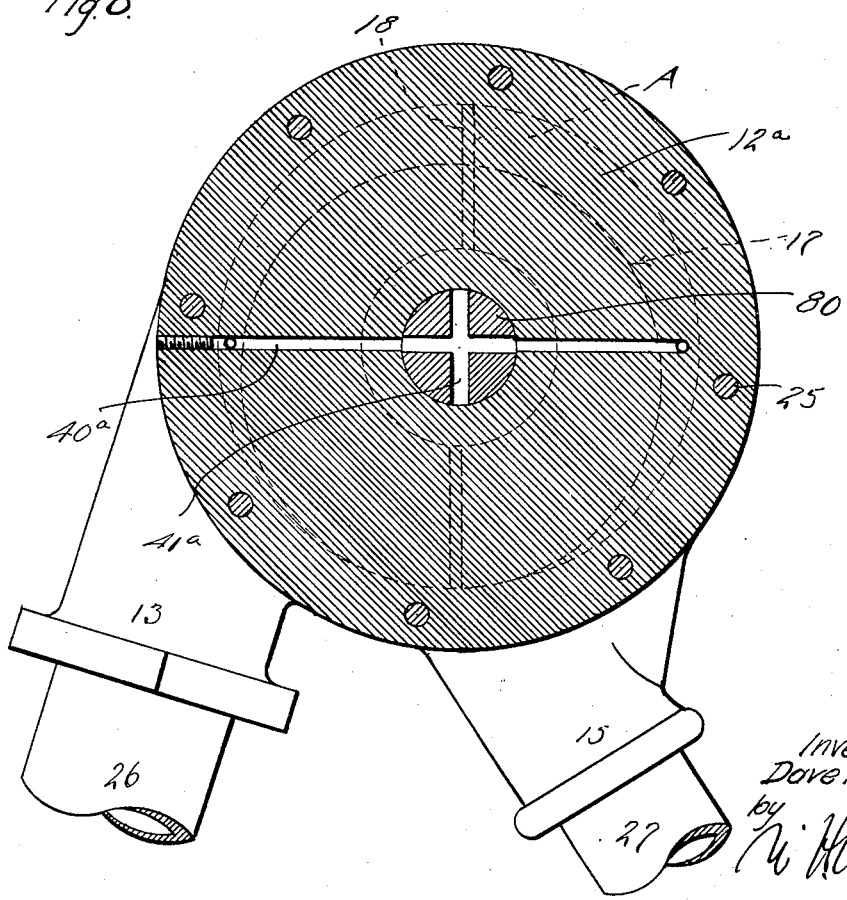

Patented Mar. 14, 1933

1,901,348

UNITED STATES PATENT OFFICE

DAVE KAPUCZIN, OF LOS ANGELES, CALIFORNIA

FLUID DISPENSER OR METER

Application filed February 21, 1928. Serial No. 255,879.

This invention has to do with a device to be used in dispensing fluid, and it is a general object of the invention to provide a meter or measuring dispenser useful in handling oils, and the like.

Various liquids, for example, oils are commonly dispensed by apparatus in which the oil is fed under pressure through a device in the form of an indicating and registering meter. In this class of apparatus the control is obtained through a valve, or the like, the meter functioning as a measuring instrument.

It is a primary object of this invention to provide a simple, practical and improved meter for handling fluids under conditions such as are present in apparatus of the class above-mentioned.

Another object of this invention is to provide a meter of the character mentioned embodying an improved and effective regulating or adjusting means whereby it can be set or adjusted to operate accurately.

Another object of the invention is to provide improvements in the formation and arrangement of parts in a rotary type of meter, whereby the parts operate efficiently and without becoming clogged or inoperative through the accumulation of dirt or other foreign matter.

It is another object of my invention to provide an improved indicating dial arrangement whereby the dial can be advanced only by operation of the meter and can readily be retracted to the zero position.

The various objects and features of the invention will be best and more fully understood from the following detailed description of typical forms and applications of the invention, throughout which description reference is had to the accompanying drawings, in which:

Figure 1 is a face view of the improved meter embodying the invention.

Fig. 2 is an enlarged detail sectional view of the meter taken through the rotor and showing the port arrangement in detail.

Fig. 3 is an enlarged detail fragmentary view showing the construction provided to prevent clogging of the rotor in the event that foreign matter gets into the meter, being a view taken substantially as indicated by line 3—3 on Fig. 4.

Fig. 4 is a transverse sectional view taken as indicated by line 4—4 on Fig. 2.

Fig. 5 is a view taken as indicated by line 5—5 on Fig. 4.

Fig. 6 is a view taken as indicated by line 6—6 on Fig. 5.

Fig. 7 is a transverse sectional view showing a modified form of construction, and Fig. 8 is a view taken as indicated by line 8—8 on Fig. 7.

The meter provided by this invention includes, generally, a cylindrical body 10, ends 11 and 12 closing the body, an intake connection 13 in communication with an intake port 14 in the body 10, an outlet connection 15 in communication with an outlet port 16 in the body, a rotor 17 smaller than the body and mounted in the body in engagement with the body at a point between the ports 14 and 16 forming a passage or chamber A in the body through which fluid must pass in flowing between the ports, a plurality of blades 18 carried by the rotor 17 forming propelling means whereby the rotor is operated by passage of fluid through the chamber A, an adjusting by-pass 19 whereby fluid may be by-passed between the connections 13 and 15 without passing through the chamber A, an indicator 20 for indicating the extent of operation of the rotor, drive means 21 between the rotor and indicator whereby the indicator can be advanced only by operation of the rotor and can be freely retracted manually, stop means 22 operable to stop the indicator at the zero position upon its being retracted, a register 23 operable to indicate the total operation of the rotor and various other features and parts, the details of which will be hereinafter described.

The body 10 is preferably in the form of a simple cylinder closed at its ends by the ends 11 and 12. In the particular construction illustrated the body 10 is in the form of a casting having the end 11 and also the intake and outlet connections 13 and 15, respectively, cast integral with it. The end 12 is in the form of a plate mounted on the end of the body 10 by means of screws 25. The intake connection 13 is adapted to provide means for connecting the meter with a supply pipe 26, or the like, and may be finished or fitted to make a proper connection with whatever form of supply conduit is used. In the drawings I have shown an ordinary threaded supply pipe 26 in which case the connection 13 is internally screw threaded to receive the pipe. The opening of the connection 13 is in direct communication with port 14 which port extends a substantial distance around the body 10. The outlet connection 15 like the intake connection may be finished or fitted to accommodate any suitable outlet conduit 27. In the case illustrated the outlet conduit is in the form of pipe screw threaded into the connection 15. The outlet connection 15 is in direct communication with the port 16 which port extends a substantial distance around the body.

The rotor 17 is rotatably mounted in the body 10 and comprises a cylindrical rim 29 provided on a disk 30. The disk 30 has a central trunnion 31 rotatably supported in the body. The rim of the rotor slidably fits between the ends 11 and 12 and slidably fits a seat 32 provided in the body between the ports 14 and 16. The rotor is, of course, smaller in diameter than the interior of the body and is mounted eccentric in the body to operate in the seat 32, the seat being formed in the wall of the body concentric with the pivotal axis of the rotor.

The blades 18 carried by the rotor are slidably mounted in guide slots 33 formed in the rotor. The blades 18 are guided by a central guide 34 projecting from one of the ends, for instance, the end 11, so that they project from the rotor at the chamber A to form partitions in the chamber as they operate through it. The guide 34 is formed integral with the end 11 and has its outer or guiding part formed concentric with the body 10. The blades are offset somewhat from true radial positions with reference to the rotor so that they fit the body accurately from the intake port through the chamber A to the outlet port. The manner in which the guide 14 operates the blades with reference to the rotor and body will be apparent from Fig. 2 of the drawings. In practice the parts are arranged and proportioned so that there is always at least one blade 18 in position to form a partition or division in the chamber A between the ports 14 and 16.

The by-pass means is provided as a means for regulating or adjusting the amount of fluid passed by the meter for a given movement of the rotor and may be adjusted to compensate for any leakage or inaccuracy that may occur in the measuring action of the rotor and blades. In the form of the invention shown in Figs. 1 to 4 inclusive, the by-pass means includes a by-pass port 40 opening into the seat 32 in the body and communicating with the outlet connection 15. Recesses 41 are provided in the rim 29 of the rotor to form communication between the port 14 and the by-pass port 40 during a predetermined portion of the rotation of the rotor. I provide a passageway or conduit in the periphery of the rotor adjacent each blade 18. The conduits or passageways are in the form recesses 41 which are of equal length and sufficiently long to leave the ports 14 and 40 connected for a substantial proportion of each revolution of the rotor. An adjusting screw 42 is provided as a regulator or choking means for the port 40 and can be set to adjust or vary the capacity of the port 40, thus governing the amount of fluid by-passed between the port 14 and the outlet connection 15. A lock nut 43 is provided in connection with the screw 42 so that it can be set in the desired adjusted position.

In accordance with my invention a transverse recess 44 is provided in the rim 29 of the rotor immediately in front of each blade 18 to receive dirt or foreign matter that may enter the device and tend to lodge between the rotor and seat 32. In the preferred construction the recesses 44 are formed so that they are in communication with the recesses 41, allowing trapped matter to discharge through the recesses 41; it being apparent that the recesses 41 are sufficiently large and so related to the ports as to allow such matter to freely escape.

The indicator 20 is in the form of a dial mounted behind a cover plate 50 of a housing 51 formed on the parts above described. The dial cooperates with a sight opening 52 in the cover 50. The cover is provided with a reference mark 53 adapted to coperate with a suitable scale marked on or applied to the dial 20. The dial 20 is operated from the rotor through the mounting trunnion 31 of the rotor, a train of gears 54 and a ratchet mechanism 55. The ratchet mechanism includes a hub 56 operated by one of the gears 54 and carrying a plurality of spring pressed wedge members or balls 57. An annular flange 58 projects from the dial 20 and fits over the balls 57 and hub 56 as clearly shown in Fig. 5 of the drawings. This construction provides a ratchet drive whereby the dial is operated by the gear 54 to advance the scale with reference to the reference mark 53 and can be manually operated only in a reverse direction to approach the zero or unactuated position of the dial. The dial may be readily operated in a rearward direction by engaging it through the sight opening 52. With this arrangement and operator cannot advance the dial to indicate an amount greater than has been actually passed by the meter, however, he can freely manipulate the dial to retract or return it to the zero position. The means 22 provided for stopping the dial upon its being returned to the zero position may include a spring pressed stop 60 carried on a guide pin 61 and adapted to cooperate with a latch stop 62 on the dial. The stop 62 on the dial may be shaped to allow the dial to pass the stop when moving in an advancing direction and to positively stop it at the zero position when being retracted or returned. The stop 62 may be formed in the dial 20 by making a U-shaped cut in the dial and then bending the cut part to form a lip or tongue on the under side of the dial 20, as clearly shown in Figs. 1 and 6 of the drawings. The means for indicating the total operation of the meter may include an ordinary counter mechanism 70 operatively connected with the rotor, for instance, with the mounting trunnion of the motor through suitable gears 71. A sight opening 72 may be provided in the front 50 of the housing so that the operation of the counter can be observed.

In operation the fluid, for instance, oil, to be disposed and measured is fed to the meter under pressure through the supply pipe 26. As the fluid passes through the meter it acts on the blades 18 to cause rotation of the rotor 17. A certain amount of fluid may be by-passed through the by-pass means 19 so that the desired amount of fluid passes between the connections 13 and 15 during a given amount of rotation of the rotor. I have found that this form of by-pass is effective and accurate as the period of time that the by-pass port 40 is in operation through the recesses 41 is definitely related to the speed of operation of the rotor. Under this condition if the liquid is supplied at a high pressure the rotor will operate at a high speed and the flow through the by-pass will be rapid, whereas, if the liquid is supplied under a low pressure, rotation of the rotor will be slow and the flow of fluid through the by-pass will be slow. In either case the total amount passing through the meter will be the same.

In the form of the invention illustrated in Figs. 7 and 8 of the drawings I show another form of by-pass arrangement. In this case a by-pass port 40a is provided in the end 12a to form a communication between the chamber A adjacent the port 14 and a point adjacent the port 16. The operation of the rotor controls the by-pass 40a in that a projection 80 is provided on the rotor to intersect the port 40a. The projection 80 may be fixed on the rotor shaft 31 in any suitable manner; for example, it may be forcefitted or welded on the shaft. The projection 80 is provided with transverse conduits, passageways, or connection ports 41a arranged to form communications between the two parts of the port 40a during certain periods of operation of the rotor. A control screw 42a may be provided in connection with the port 40a corresponding to the screw 42a in the form of the invention first described. It will be apparent that this form of the invention operates in very much the same manner as that first described in that the rotor directly controls the time during which the by-pass port is open, and thus enables the mechanism to be set so that the meter will pass a definite quantity of fluid for a given amount of rotation for the rotor.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A meter of the character described having a cylindrical body with spaced ports, a rotor mounted eccentric in the body and having sliding engagement with the body between the ports, and blades carried by the rotor, there being means whereby fluid passes freely through the body between the ports, said means including recesses in the peripheral portion of the rotor.

2. A meter of the character described having a cylindrical body with spaced ports, a rotor mounted eccentric in the body and having sliding engagement with the body between the ports, and blades carried by the rotor; there being means for by-passing fluid between the ports, said means including two cooperating conduits, one stationary and in the body and the other in the rotor.

3. A meter of the character described having a cylindrical body with spaced ports, a rotor mounted eccentric in the body and having sliding engagement with the body between the ports, and blades carried by the rotor; there being means for by-passing fluid between the ports, said means including two cooperating conduits, one stationary and in the body and the other in the rotor, and regulating means in the stationary conduit.

4. A meter of the character described having a cylindrical body with spaced ports, a cylindrical rotor mounted eccentric in the body and having sliding engagement with the body between the ports, and blades carried by the rotor; there being means for by-passing fluid between the ports, said means including an opening in the body and fluid conduits in the periphery of the rotor.

5. A meter of the character described having a cylindrical body with spaced ports, a rotor mounted eccentric in the body and having sliding engagement with the body between the ports, and blades carried by the rotor, there being means for by-passing fluid between the ports, said means including a conduit in the body, and fluid conduits in the peripheral face of the rotor adapted to cooperate with the conduit in the body, the rotor having transverse recesses in its peripheral portion communicating with the fluid conduits.

In witness that I claim the foregoing I have hereunto subscribed my name this 3rd day of February, 1928.

DAVE KAPUCZIN.